US012131673B2

(12) United States Patent
Piao et al.

(10) Patent No.: US 12,131,673 B2
(45) Date of Patent: Oct. 29, 2024

(54) DISPLAY DRIVING CIRCUIT HAVING SHORT DETECTION FUNCTION

(71) Applicant: LX Semicon Co., Ltd., Daejeon (KR)

(72) Inventors: Taiming Piao, Daejeon (KR); Young Tae Kim, Daejeon (KR); Won Kim, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 1 day.

(21) Appl. No.: 18/084,375

(22) Filed: Dec. 19, 2022

(65) Prior Publication Data

US 2023/0215309 A1 Jul. 6, 2023

(30) Foreign Application Priority Data

Dec. 28, 2021 (KR) ........................ 10-2021-0189254

(51) Int. Cl.
*G09G 3/3275* (2016.01)
*G09G 3/00* (2006.01)

(52) U.S. Cl.
CPC ..... *G09G 3/006* (2013.01); *G09G 2310/0291* (2013.01); *G09G 2310/0297* (2013.01); *G09G 2310/08* (2013.01); *G09G 2330/12* (2013.01)

(58) Field of Classification Search
CPC ............... G09G 3/006; G09G 2370/08; G09G 2310/0291; G09G 2330/12; G09G 2310/08; G09G 2310/0297; G09G 2310/0275; G09G 2300/0426
See application file for complete search history.

(56) References Cited

U.S. PATENT DOCUMENTS

| | | | | |
|---|---|---|---|---|
| 9,361,820 | B2 | 6/2016 | Lee et al. | |
| 10,650,715 | B2 | 5/2020 | Cho | |
| 10,832,606 | B2 | 11/2020 | Kim et al. | |
| 10,997,882 | B2 | 5/2021 | Kim et al. | |
| 2016/0104402 | A1 | 4/2016 | Kim | |
| 2017/0245379 | A1 | 8/2017 | Kang | |
| 2020/0265787 | A1 * | 8/2020 | Im | G09G 3/3291 |
| 2021/0142702 | A1 * | 5/2021 | Lee | G09G 3/006 |
| 2023/0196956 | A1 * | 6/2023 | Lee | G09G 3/3233 324/760.01 |

* cited by examiner

*Primary Examiner* — Dennis P Joseph
(74) *Attorney, Agent, or Firm* — POLSINELLI PC

(57) ABSTRACT

The present disclosure discloses a display driving circuit. The display driving circuit is configured to have a function of detecting a short of a data line occurring on a display panel.

13 Claims, 6 Drawing Sheets

DISPLAY DRIVING CIRCUIT HAVING SHORT DETECTION FUNCTION

BACKGROUND

1. Technical Field

Various embodiments generally relate to a display driving circuit, and more particularly, to a display driving circuit having a function of detecting a short of a data line on a display panel.

2. Related Art

A display system includes a display panel, a display driving circuit and a timing controller. The display driving circuit converts image data provided from the timing controller into a source signal, and provides the source signal to the display panel.

The display driving circuit may include a digital-to-analog converter which converts the image data into the source signal and an output buffer which outputs the source signal to a data line of the display panel.

The display panel may display an image by the source signal provided from the display driving circuit.

However, the data line may be shorted to an adjacent data line or an adjacent power line due to a physical change (e.g., a crack) of the display panel.

In this case, a malfunction of the display panel and heat generation of the display panel due to a short may be caused.

Therefore, the display driving circuit is required to have a function of detecting the short, and an improvement reflecting this is required.

SUMMARY

Various embodiments are directed to a display driving circuit having a short detection function capable of detecting that a data line of a display panel is shorted to an adjacent data line or an adjacent power line.

Also, various embodiments are directed to a display driving circuit having a short detection function capable of determining a position where a data line of a display panel is shorted.

In an embodiment, a display driving circuit may include: a first output line connected to a first data line of a display panel: a second output line connected to a second data line of the display panel: a first detection line: a first detection circuit configured to output a first detection current to the first detection line, and output a first detection signal corresponding to a change in the first detection current: a second detection line; a second detection circuit configured to output a second detection current to the second detection line, and output a second detection signal corresponding to a change in the second detection current: a first switching circuit configured to connect the first detection line to one of the first output line and the second output line; and a second switching circuit configured to connect the second detection line to the other of the first output line and the second output line.

In an embodiment, a display driving circuit may include: a first detection line: a second detection line: a first switching circuit configured to connect the first detection line to one output lines among odd-numbered first output lines which are connected to odd-numbered first data lines of a display panel and even-numbered second output lines which are connected to even-numbered second data lines of the display panel: a second switching circuit configured to connect the second detection line to the other output lines among the first output lines and the second output lines: a first detection circuit configured to output a first detection current to the first detection line, and output a first detection signal corresponding to a change in the first detection current; and a second detection circuit configured to output a second detection current to the second detection line, and output a second detection signal corresponding to a change in the second detection current.

According to the embodiments of the present disclosure, by providing a detection current to a data line of a display panel through a detection line and determining a change in the detection current, it is possible to determine whether the data line is shorted. Accordingly, it is possible to detect that the data line of the display panel is shorted to an adjacent data line or an adjacent power line.

Also, according to the embodiments of the present disclosure, it is possible to provide a detection current to each data line of the display panel through a detection line and determine a change in the detection current of the data line. Accordingly, it is possible to accurately determine a position where a data line of the display panel is shorted.

DETAILED DESCRIPTION

Figure 1:
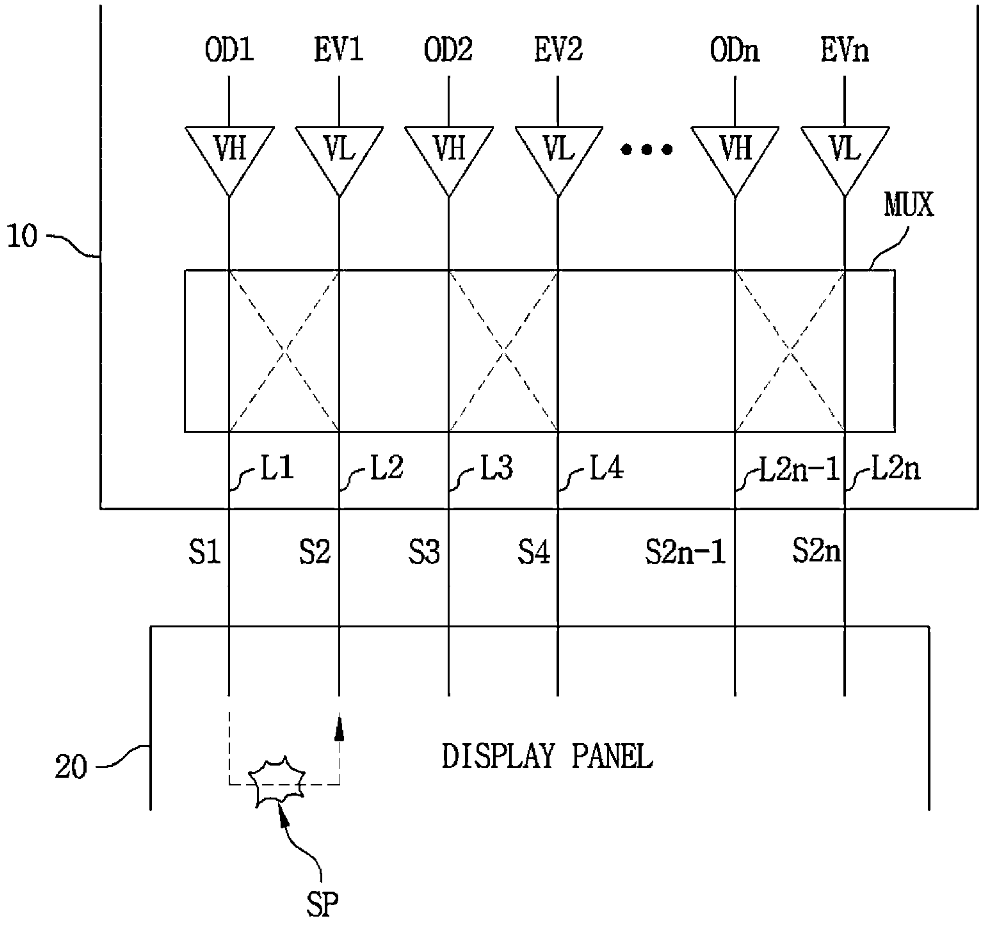
FIG. 1 is a block diagram illustrating an example of a general display driving circuit.

As shown in FIG. 1, a general display driving circuit 10 is configured to provide source signals S1 to S2*n* to a display panel 20.

The display driving circuit 10 may include a digital-to-analog converter (not shown), output buffers VH and VL and a multiplexer MUX. The digital-to-analog converter converts image data into an analog signal, the output buffers VH and VL drive analog signals outputted from the digital-to-analog converter to output the source signals S1 to S2*n*, and the multiplexer MUX selects output paths of the source signals S1 to S2*n* of the output buffers VH and VL.

The display driving circuit 10 of FIG. 1 is schematically illustrated for the description of the present disclosure, and may further include various components such as a gamma buffer.

The display driving circuit 10 is configured to output the source signals S1 to S2*n* through output lines L1 to L2*n*, and the output lines L1 to L2*n* may output the source signals S1 to S2*n* of the output buffers VH and VL transferred through the output paths selected by the multiplexer MUX.

The display panel 20 includes data lines (not shown) which are electrically connected to the output lines L1 to L2*n*, and pixels (not shown) may be configured on the data lines.

The display panel 20 is configured such that a plurality of scan lines (not shown) intersect with the data lines, and the pixels may be formed at positions where the scan lines and the data lines intersect with each other. It may be understood that the data line forms a column line of the display panel 20 and the scan line forms a row line of the display panel 20.

In addition to the data line and the scan line, voltage lines (not shown) which provide a voltage for driving the pixels may be formed in the display panel 20.

The pixels of the display panel 20 may require polarity inversion of the pixels in order to improve image quality.

The source signals S1 to S2*n* may be driven in a voltage range between a high voltage (e.g., a driving voltage VDDH (refer to FIG. 3)) and a low voltage (e.g., a ground voltage VSSH (refer to FIG. 4)). In order for the polarity inversion of the pixels, source signals of adjacent data lines may be provided to have inverted polarities. In addition, the source signal which is provided to one data line may also be provided to have an inverted polarity by the unit of a horizontal period.

In order for the polarity inversion, a voltage (e.g., a medium voltage HVDD (refer to FIG. 3 or 4)) between the high voltage and the low voltage may be used.

In FIG. 1, the output buffers VH may be configured to output positive source signals of a first voltage range between the high voltage and the medium voltage HVDD in response to input signals OD1 to ODn, and the output buffers VL may be configured to output negative source signals of a second voltage range between the medium voltage HVDD and the low voltage in response to input signals EV1 to EVn. As shown in FIG. 1, the output buffers VH which output the positive source signals and the output buffers VL which output the negative source signals may be alternately disposed. The output buffers VH correspond to odd-numbered output buffers, and the output buffers VL correspond to even-numbered output buffers.

The multiplexer MUX is to control the output paths between the output buffers VH and VL and the output lines L1 to L2*n*. The output lines L1, L3, . . . , L2*n*−1 correspond to odd-numbered output lines, and the output lines L2, L4, . . . , L2*n* correspond to even-numbered output lines.

In order for the polarity inversion, the multiplexer MUX may control the output paths which output the source signals of a pair of adjacent output buffers VH and VL to, for example, the output lines L1 and L2. The multiplexer MUX may sequentially perform a first selection mode of connecting the output buffer VH to the output line L1 and connecting the output buffer VL to the output line L2 and a second selection mode of connecting the output buffer VH to the output line L2 and connecting the output buffer VL to the output line L1.

Therefore, it may be understood that the output lines L1 and L2 are configured between two data lines (not shown) which are disposed adjacent to each other on the display panel 20 and the output buffers VH and VL which output source signals of opposite polarities.

It may be understood that the configuration and operation of the multiplexer MUX and the configuration of output lines for each pair of output buffers VH and VL are the same.

In the above configuration, the odd-numbered output lines L1, L3, . . . . L2*n*−1 are connected to odd-numbered data lines of the display panel 20, and the even-numbered output lines L2, L4, . . . . L2*n* are connected to even-numbered data lines of the display panel 20.

Figure 2:
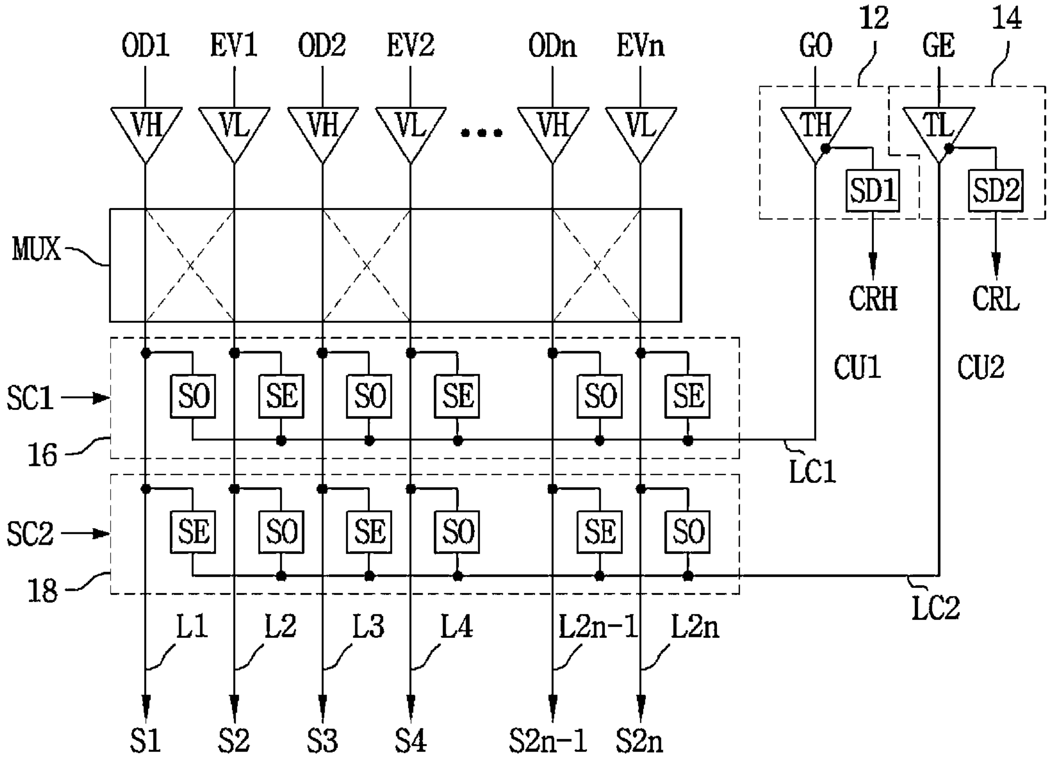
FIG. 2 is a block diagram illustrating a display driving circuit in accordance with an embodiment of the present disclosure.

A display driving circuit in accordance with an embodiment of the present disclosure may be implemented as shown in FIG. 2 in order to detect that a data line of the display panel 20 is shorted to an adjacent data line or an adjacent power line. In FIG. 1, SP denotes a short position.

To this end, the embodiment of the present disclosure may include a first detection circuit 12, a second detection circuit 14, a first switching circuit 16 and a second switching circuit 18 as shown in FIG. 2.

The first detection circuit 12 is connected to a first detection line LC1, and may be configured to output a first detection current CU1 to the first detection line LC1 and output a first detection signal CRH corresponding to a change in the first detection current CU1.

The second detection circuit 14 is connected to a second detection line LC2, and may be configured to output a second detection current CU2 to the second detection line LC2 and output a second detection signal CRL corresponding to a change in the second detection current CU2.

The first switching circuit 16 may be configured to connect the first detection line LC1 to odd-numbered first output lines L1, L3, . . . , L2*n*−1 or even-numbered second output lines L2, L4, . . . , L2*n*, corresponding to a control signal SC1.

The second switching circuit 18 may be configured to connect the second detection line LC2 to the remainder between the odd-numbered first output lines L1, L3, . . . , L2*n*−1 and the even-numbered second output lines L2, L4, . . . , L2*n*, which are not connected to the first switching circuit 16, corresponding to a control signal SC1.

The first switching circuit 16 and the second switching circuit 18 may be configured to change internal switching states while alternately performing a first switching state and a second switching state.

In more detail, in the first switching state, the first switching circuit 16 may connect the first detection line LC1 to the odd-numbered first output lines L1, L3, . . . , L2*n*−1, and the second switching circuit 18 may connect the second detection line LC2 to the even-numbered second output lines L2, L4, . . . , L2*n*.

In the second switching state, the first switching circuit 16 may connect the first detection line LC1 to the even-numbered second output lines L2, L4, . . . , L2*n*, and the second switching circuit 18 may connect the second detection line LC2 to the odd-numbered first output lines L1, L3, . . . , L2*n*−1.

To this end, the first switching circuit 16 may include first switches SO which switch the first detection line LC1 and the odd-numbered first output lines L1, L3, . . . , L2*n*−1, and second switches SE which switch the first detection line LC1 and the even-numbered second output lines L2, L4, . . . , L2*n*.

The second switching circuit 18 may include third switches SE which switch the second detection line LC2 and the odd-numbered first output lines L1, L3, . . . , L2*n*−1, and fourth switches SO which switch the second detection line LC2 and the even-numbered second output lines L2, L4, . . . , L2*n*.

The first switches SO of the first switching circuit 16 and the fourth switches SO of the second switching circuit 18 may be turned on in the first switching state, and the second switches SE of the first switching circuit 16 and the third switches SE of the second switching circuit 18 may be turned on in the second switching state.

That is to say, in the first switching state, the first detection line LC1 may be connected to the odd-numbered first output lines L1, L3, . . . , L2*n*−1, and the first detection current CU1 of the first detection circuit 12 may be provided to odd-numbered data lines of the display panel 20 via the odd-numbered first output lines L1, L3, . . . , L2*n*−1. Also, the second detection line LC2 may be connected to the even-numbered second output lines L2, L4, . . . , L2*n*, and the second detection current CU2 of the second detection circuit 14 may be provided to even-numbered data lines of the display panel 20 via the even-numbered second output lines L2, L4, . . . , L2*n*.

On the display panel 20, when an odd-numbered data line is shorted to an adjacent even-numbered data line or an adjacent power line, the first detection current CU1 of the first detection circuit 12 may be discharged by the short. Therefore, the first detection circuit 12 may provide the first detection signal CRH of a level corresponding to the discharge of the first detection current CU1.

On the display panel 20, when an even-numbered data line is shorted to an adjacent odd-numbered data line or an adjacent power line, the second detection current CU2 of the second detection circuit 14 may be discharged by the short. Therefore, the second detection circuit 14 may provide the second detection signal CRL of a level corresponding to the discharge of the second detection current CU2.

To this end, the first detection circuit 12 may include a buffer TH and a detection signal provider SD1, and the second detection circuit 14 may include a buffer TL and a detection signal provider SD2.

Figure 3:
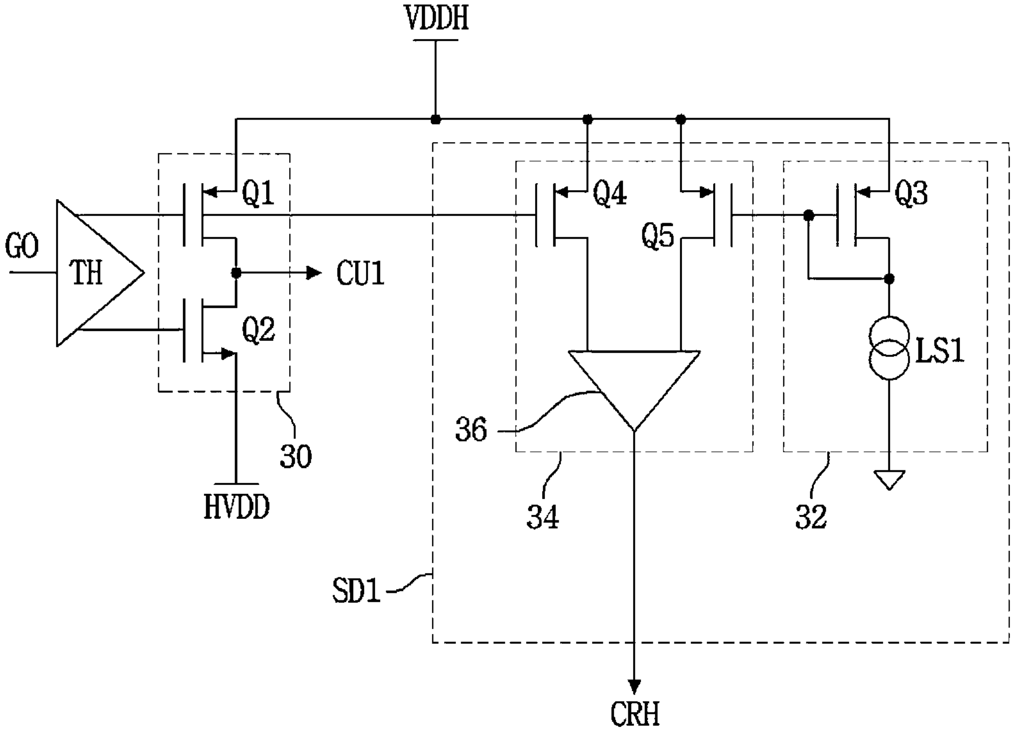
FIG. 3 is a circuit diagram illustrating a first detection circuit of FIG. 2.
Figure 4:
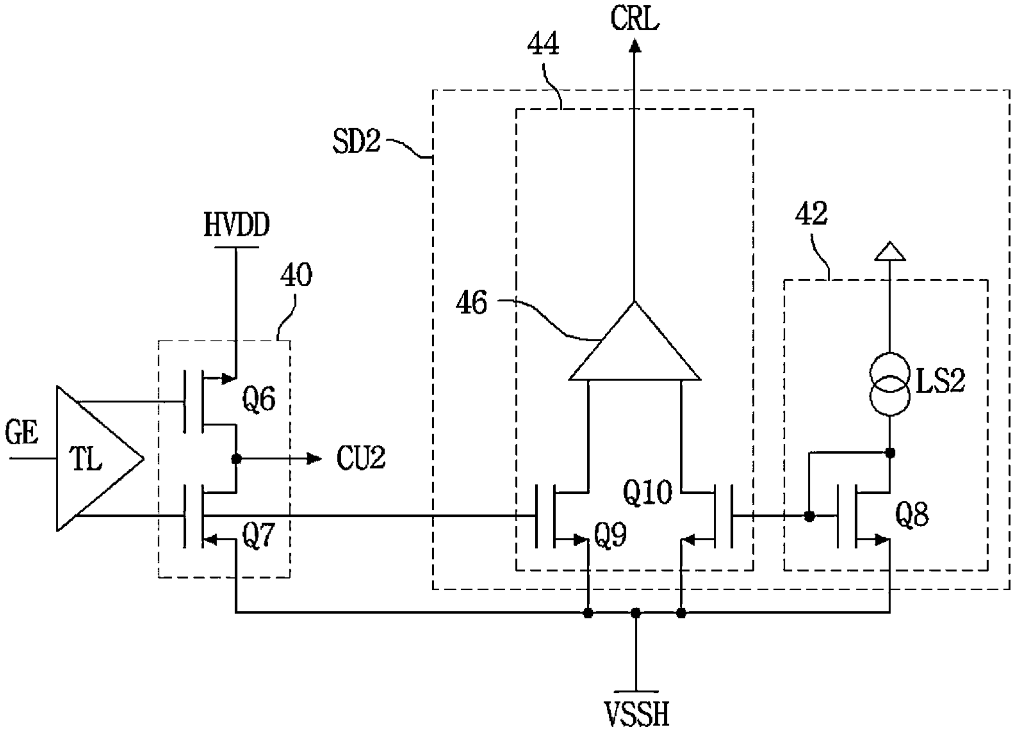
FIG. 4 is a circuit diagram illustrating a second detection circuit of FIG. 2.

The first detection circuit 12 may be configured as shown in FIG. 3, and the second detection circuit 14 may be configured as shown in FIG. 4.

The configuration of the first detection circuit 12 will be described below with reference to FIG. 3.

The first detection circuit 12 may include the buffer TH including an output circuit 30.

The buffer TH is configured to receive a first test signal GO of a first voltage range (a positive range) between a driving voltage VDDH as a high voltage and a medium voltage HVDD and output the first detection current CU1 to the first detection line LC1. It may be understood that the first test signal GO is a voltage of a preset level which is included in the first voltage range.

The buffer TH includes the output circuit 30 which forms an output end. The buffer TH is configured to provide a driving signal of a high level and a driving signal of a low level generated therein in response to the first test signal GO, to the output circuit 30.

The output circuit 30 includes a PMOS transistor Q1 having a gate to which the driving signal of a high level is applied and an NMOS transistor Q2 having a gate to which the driving signal of a low level is applied, and may output the first detection current CU1 through a node between the PMOS transistor Q1 and the NMOS transistor Q2. The driving voltage VDDH is applied to a source of the PMOS transistor Q1, and the medium voltage HVDD is applied to a source of the NMOS transistor Q2.

By the above configuration, the output circuit 30 may output the first detection current CU1 corresponding to the first test signal GO.

The detection signal provider SD1 of the first detection circuit 12 may include a first comparison voltage provider 32 and a first comparison circuit 34.

The first comparison voltage provider 32 is to provide a first comparison current of a preset level, and may include a PMOS transistor Q3 having a source to which the driving voltage VDDH as the high voltage is applied and a current source LS1 which controls the first comparison current, flowing through the PMOS transistor Q3, to a preset amount.

The first comparison circuit 34 is configured to output the first detection signal CRH by comparing the first detection current CU1 of the output circuit 30 of the buffer TH and the first comparison current of the first comparison voltage provider 32.

In more detail, the first comparison circuit 34 may be configured to include a PMOS transistor Q4 which shares a gate with the PMOS transistor Q1 of the output circuit 30, a PMOS transistor Q5 which shares a gate with the PMOS transistor Q3 of the first comparison voltage provider 32, and a comparator 36 which compares a first copy current of the PMOS transistor Q4 and a second copy current of the PMOS transistor Q5.

In the first comparison circuit 34, the PMOS transistor Q4 may provide the first copy current proportional to the first detection current CU1 to the comparator 36, and the PMOS transistor Q5 may provide the second copy current proportional to the first comparison current to the comparator 36.

The comparator 36 may output the first detection signal CRH corresponding to a difference between the first detection current CU1 and the first comparison current.

The configuration of the second detection circuit 14 will be described below with reference to FIG. 4.

The second detection circuit 14 may include the buffer TL including an output circuit 40.

The buffer TL is configured to receive a second test signal GE of a second voltage range (a negative range) between a ground voltage VSSH as a low voltage and the medium voltage HVDD and output the second detection current CU2 to the second detection line LC2. It may be understood that the second test signal GE is a voltage of a preset level which is included in the second voltage range.

The buffer TL includes the output circuit 40 which forms an output end. The buffer TL is configured to provide a driving signal of a high level and a driving signal of a low level generated therein in response to the second test signal GE, to the output circuit 40.

The output circuit 40 includes a PMOS transistor Q6 having a gate to which the driving signal of a high level is applied and an NMOS transistor Q7 having a gate to which the driving signal of a low level is applied, and may output the second detection current CU2 through a node between the PMOS transistor Q6 and the NMOS transistor Q7. The medium voltage HVDD is applied to a source of the PMOS transistor Q6, and the ground voltage VSSH is applied to a source of the NMOS transistor Q7.

By the above configuration, the output circuit 40 may output the second detection current CU2 corresponding to the second test signal GE.

The detection signal provider SD2 of the second detection circuit 14 may include a second comparison voltage provider 42 and a second comparison circuit 44.

The second comparison voltage provider 42 is to provide a second comparison current of a preset level, and may include an NMOS transistor Q8 having a source to which the ground voltage VSSH as the low voltage is applied and a current source LS2 which controls the second comparison current, flowing through the NMOS transistor Q8, to a preset amount.

The second comparison circuit 44 is configured to output the second detection signal CRL by comparing the second detection current CU2 of the output circuit 40 of the buffer TL and the second comparison current of the second comparison voltage provider 42.

In more detail, the second comparison circuit 44 may be configured to include an NMOS transistor Q9 which shares a gate with the NMOS transistor Q7 of the output circuit 40, an NMOS transistor Q10 which shares a gate with the NMOS transistor Q8 of the second comparison voltage provider 42, and a comparator 46 which compares a third copy current of the NMOS transistor Q9 and a fourth copy current of the NMOS transistor Q10.

In the second comparison circuit 44, the NMOS transistor Q9 may provide the third copy current proportional to the second detection current CU2 to the comparator 46, and the NMOS transistor Q10 may provide the fourth copy current proportional to the second comparison current to the comparator 46.

The comparator 46 may output the second detection signal CRL corresponding to a difference between the second detection current CU2 and the second comparison current.

By the above-described configuration, when an odd-numbered data line is shorted to an adjacent even-numbered data line or an adjacent power line, the first detection current CU1 of an odd-numbered output line which is connected to the odd-numbered data line may change. The first detection circuit 12 may detect a change in the first detection current CU1, and may output the first detection signal CRH corresponding to the first detection current CU1 which has changed in correspondence to the short.

When an even-numbered data line is shorted to an adjacent odd-numbered data line or an adjacent power line, the second detection current CU2 of an even-numbered output line which is connected to the even-numbered data line may change. The second detection circuit 14 may detect a change in the second detection current CU2, and may output the second detection signal CRL corresponding to the second detection current CU2 which has changed in correspondence to the short.

The embodiment of the present disclosure may be configured such that, in order to simultaneously determine all output lines, the first switching circuit 16 and the second switching circuit 18 alternately perform the first switching state and the second switching state.

For example, in the first switching state, the first switching circuit 16 may simultaneously connect the first detection line LC1 to the odd-numbered first output lines L1, L3, . . . , L2*n*−1, and the second switching circuit 18 may simultaneously connect the second detection line LC2 to the even-numbered second output lines L2, L4, . . . , L2*n*. Conversely, in the second switching state, the first switching circuit 16 may simultaneously connect the first detection line LC1 to the even-numbered second output lines L2, L4, . . . , L2*n*, and the second switching circuit 18 may simultaneously connect the second detection line LC2 to the odd-numbered first output lines L1, L3, . . . , L2*n*−1.

The embodiment of the present disclosure may be configured such that the first switching circuit 16 and the second switching circuit 18 are controlled in order to determine output lines in a time division manner by the unit of a pair of adjacent output lines.

For example, the first switching circuit 16 and the second switching circuit 18 may alternately perform connections of the first switching state and the second switching state for a pair of an odd-numbered first output line and an even-numbered second output line which are adjacent to each other.

In this case, connections of the first switching state and the second switching state may be performed in a time division manner by the unit of a pair of adjacent output lines. In this case, in the first switching state, the first switching circuit 16 connects the first detection line LC1 to an odd-numbered first output line, and the second switching circuit 18 connects the second detection line LC2 to an even-numbered second output line. In the second switching state, the first switching circuit 16 connects the first detection line LC1 to an even-numbered second output line, and the second switching circuit 18 connects the second detection line LC2 to an odd-numbered first output line.

Therefore, the embodiment of the present disclosure may determine whether a short has occurred and an accurate position of the short, by the first detection signal CRH and the second detection signal CRL.

Figure 5:
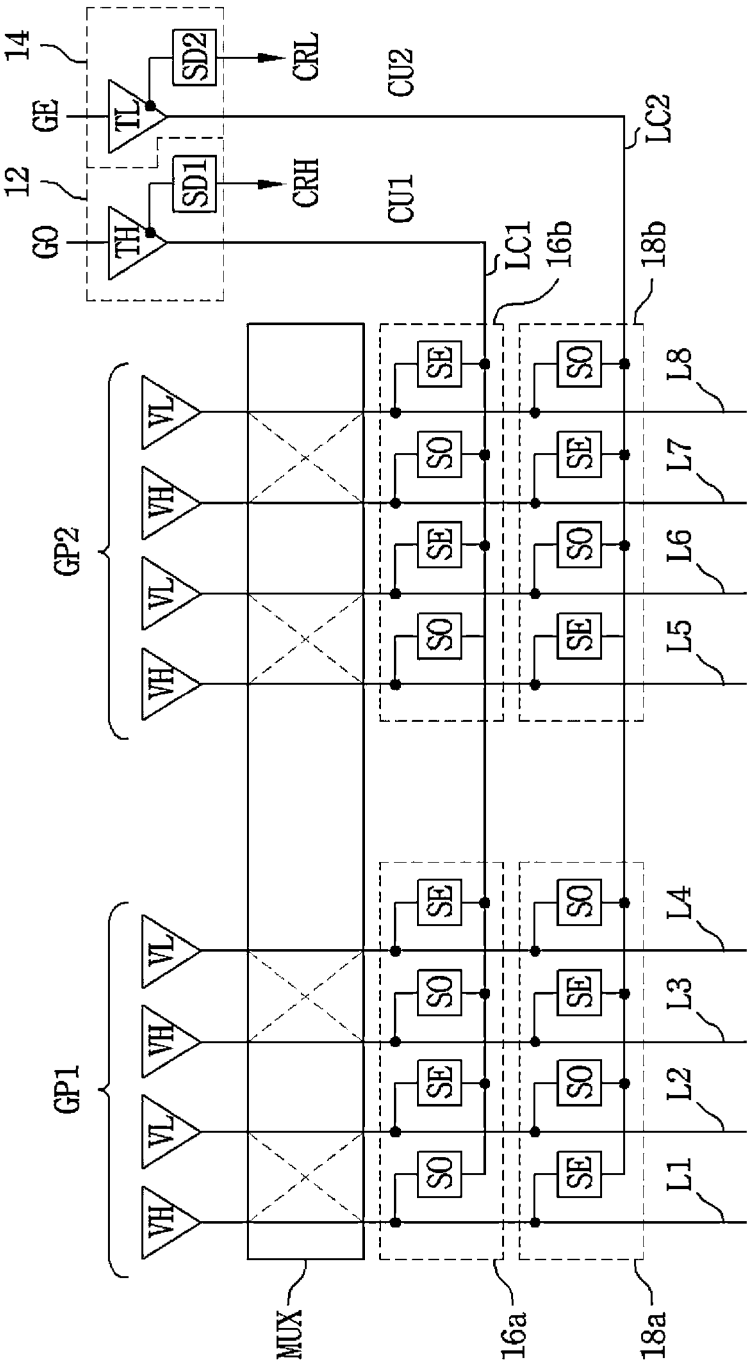
FIG. 5 is a block diagram illustrating an embodiment of the present disclosure for detecting a short in each group.

Meanwhile, in the present disclosure, as shown in FIG. 5, the odd-numbered first output lines L1, L3, . . . , L2*n*−1 and the even-numbered second output lines L2, L4, . . . , L2*n* may be classified into a first group GP1 and a second group GP2.

In FIG. 5, in order for description of the embodiment, it is illustrated that the output lines L1 to L4 are included in the first group GP1 and the output lines L5 to L8 are included in the second group GP2, a first switching circuit and a second switching circuit corresponding to the first group GP1 are denoted by 16*a* and 18*a*, respectively, and a first switching circuit and a second switching circuit corresponding to the second group GP2 are denoted by 16*b* and 18*b*, respectively.

When configured as shown in FIG. 5, the present disclosure may be implemented such that switching for the first group GP1 and switching for the second group GP2 are performed in a time division manner.

To this end, in the first switching state, the first switching circuit 16*a* may simultaneously connect the first detection line LC1 to the odd-numbered first output lines L1 and L3 of the first group GP1, and the second switching circuit 18*a* may simultaneously connect the second detection line LC2 to the even-numbered second output lines L2 and L4 of the first group GP1. Conversely, in the second switching state, the first switching circuit 16*a* may simultaneously connect the first detection line LC1 to the even-numbered second output lines L2 and L4, and the second switching circuit 18*a* may simultaneously connect the second detection line LC2 to the odd-numbered first output lines L1 and L3.

After the switching for the first group GP1 is completed, the switching for the second group GP2 may be performed.

In other words, in the first switching state, the first switching circuit 16*b* may simultaneously connect the first detection line LC1 to the odd-numbered first output lines L5 and L7 of the second group GP2, and the second switching circuit 18*b* may simultaneously connect the second detection line LC2 to the even-numbered second output lines L6 and L8 of the second group GP2. Conversely, in the second switching state, the first switching circuit 16*b* may simultaneously connect the first detection line LC1 to the even-numbered second output lines L6 and L8, and the second switching circuit 18*b* may simultaneously connect the second detection line LC2 to the odd-numbered first output lines L5 and L7.

Figure 6:
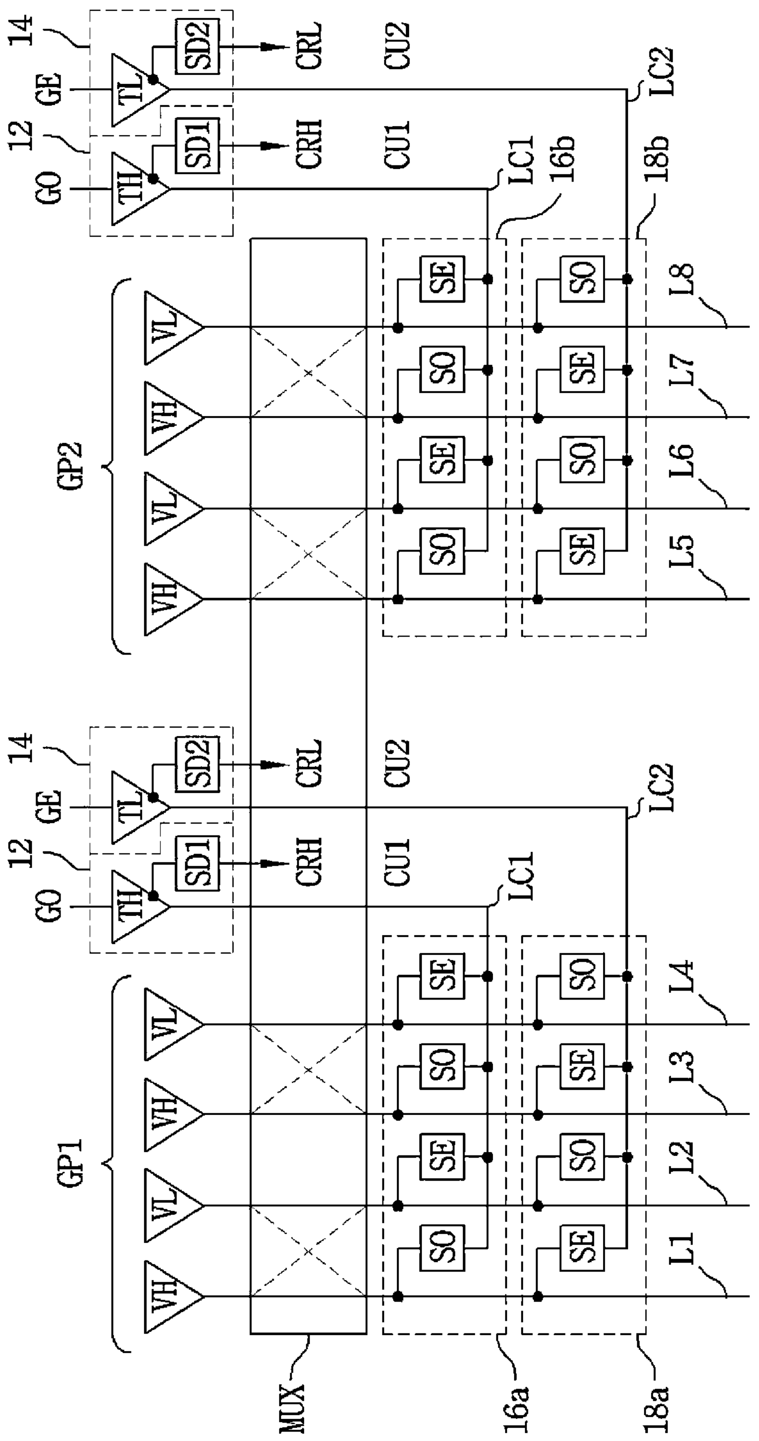
FIG. 6 is a block diagram illustrating another embodiment of the present disclosure for detecting a short in each group.

Moreover, as shown in FIG. 6, the present disclosure may be implemented such that the odd-numbered first output lines L1, L3, . . . , L2*n*−1 and the even-numbered second output lines L2, L4, . . . , L2*n* are classified into a first group GP1 and a second group GP2 and the first detection circuit 12 and the second detection circuit 14 are configured for each group.

In FIG. 6, in order for description of the embodiment, it is illustrated that the output lines L1 to L4 are included in the first group GP1 and the output lines L5 to L8 are included in the second group GP2, a first switching circuit and a second switching circuit corresponding to the first group GP1 are denoted by 16*a* and 18*a*, respectively, and a first switching circuit and a second switching circuit corresponding to the second group GP2 are denoted by 16*b* and 18*b*, respectively.

When configured as shown in FIG. 6, the present disclosure may be implemented such that the first switching state and the second switching state are simultaneously performed for each group.

Namely, the first switching state and the second switching state for each group are alternately performed, and the first group GP1 and the second group GP2 may simultaneously perform the first switching state and then may simultaneously perform the second switching state.

In the first switching state, the first switching circuits 16*a* and 16*b* of the first group GP1 and the second group GP2 simultaneously connect the first detection line LC1 to the odd-numbered first output lines L1, L3, L5 and L7, and the second switching circuits 18*a* and 18*b* simultaneously connect the second detection line LC2 to the even-numbered second output lines L2, L4, L6 and L8. In the second switching state, the first switching circuits 16*a* and 16*b* of the first group GP1 and the second group GP2 simultaneously connect the first detection line LC1 to the even-numbered second output lines L2, L4, L6 and L8, and the second switching circuits 18*a* and 18*b* of the first group GP1 and the second group GP2 simultaneously connect the second detection line LC2 to the odd-numbered first output lines L1, L3, L5 and L7.

In addition, when configured as shown in FIG. 6, the present disclosure may be implemented such that the first switching state and the second switching state are performed in a time division manner simultaneously in respective groups.

That is to say, the present disclosure may be configured such that connections of the first switching state and the second switching state may be performed in a time division manner by the unit of a pair of adjacent output lines simultaneously in respective groups.

In the first switching state, the first switching circuit 16*a* of the first group GP1 connects the first detection line LC1 to the odd-numbered first output line L1, and the second switching circuit 18*a* of the first group GP1 connects the second detection line LC2 to the even-numbered second output line L2. At the same time, the first switching circuit 16*b* of the second group GP2 connects the first detection line LC1 to the odd-numbered first output line L5, and the second switching circuit 18*b* of the second group GP2 connects the second detection line LC2 to the even-numbered second output line L6.

In the second switching state, the first switching circuit 16*a* of the first group GP1 connects the first detection line LC1 to the even-numbered second output line L2, and the second switching circuit 18*a* of the first group GP1 connects the second detection line LC2 to the odd-numbered first output line L1. At the same time, the first switching circuit 16*b* of the second group GP2 connects the first detection line LC1 to the even-numbered second output line L6, and the second switching circuit 18*b* of the second group GP2 connects the second detection line LC2 to the odd-numbered first output line L5.

Thereafter, the first switching state and the second switching state for the odd-numbered first output line L3 and the even-numbered second output line L4 of the first group GP1 and the first switching state and the second switching state for the odd-numbered first output line L7 and the even-numbered second output line L8 of the second group GP2 may be alternately performed at the same time.

As is apparent from the above description, according to the embodiments of the present disclosure, it is possible to detect a change in a detection current due to a short between data lines or a short between a data line and a power line and output a detection signal corresponding to the change in the detection current.

In particular, when the detection is performed by being time-divided in units of adjacent pairs or is performed by being time-divided in units of a plurality of blocks, it is possible to accurately determine a shorted position.

Thus, according to the embodiments of the present disclosure, advantages are provided in that it is possible to detect that a data line of a display panel is shorted to an adjacent data line or is shorted to an adjacent power line, etc. and it is possible to accurately determine a shorted position.

What is claimed is:

1. A display driving circuit comprising:

a first output line connected to a first data line of a display panel;

a second output line connected to a second data line of the display panel;

a first detection line;

a first detection circuit including first and second transistors connected to a comparator and configured to output a first detection current to the first detection line, wherein the first transistor provides a first copy current proportional to the first detection current to the comparator, and the second transistor provides a second copy current proportional to a first comparison current to the comparator, and the comparator outputs a first detection signal corresponding to a difference between first detection current and the first comparison current by comparing the first detection current and the first comparison current;

a second detection line;

a second detection circuit configured to output a second detection current to the second detection line, and output a second detection signal corresponding to a change in the second detection current;

a first switching circuit configured to connect the first detection line to one of the first output line and the second output line; and a second switching circuit configured to connect the second detection line to the other of the first output line and the second output line, wherein, in the first switching state, the first switching circuit connects the first detection line to the first output line and the second switching circuit connects the second detection line to the second output line, in the second switching state, the first switching circuit connects the first detection line to the second output line and the second switching circuit connects the second detection line to the first output line, and the first switching state and the second switching state are alternately performed.

2. The display driving circuit according to claim 1, wherein the first output line and the second output line are respectively configured between the first and second data lines which are adjacent to each other and first and second output buffers which output source signals of opposite polarities.

3. The display driving circuit according to claim 2, further comprising:

a multiplexer configured to switch connections of the first output buffer and the second output buffer to the first output line and the second output line, wherein the multiplexer sequentially performs a first selection mode of connecting the first output buffer to the first output line and connecting the second output buffer to the second output line and a second selection mode of connecting the first output buffer to the second output line and connecting the second output buffer to the first output line.

4. The display driving circuit according to claim 1, wherein the first switching circuit includes a first switch which switches between the first detection line and the first output line, and a second switch which switches between the first detection line and the second output line, the second switching circuit includes a third switch which switches between the second detection line and the first output line, and a fourth switch which switches between the second detection line and the second output line, and the first switch and the fourth switch are turned on in the first switching state, and the second switch and the third switch are turned on in the second switching state.

5. The display driving circuit according to claim 1, wherein the first detection circuit comprises:

a first buffer configured to output the first detection current to the first detection line;

a first comparison voltage provider configured to provide a first comparison current of a preset level; and a first comparison circuit configured to output the first detection signal by comparing the first detection current and the first comparison current, wherein the first buffer receives a first test signal of, in a voltage range between a high voltage higher than a medium voltage and a low voltage lower than the medium voltage, a first voltage range between the high voltage and the medium voltage, and includes an output circuit which outputs the first detection current corresponding to the first test signal.

6. The display driving circuit according to claim 1, wherein the first copy current obtained by copying the first detection current and the second copy current is obtained by copying the first comparison current.

7. The display driving circuit according to claim 1, wherein the second detection circuit comprises:

a second buffer configured to output the second detection current to the second detection line;

a second comparison voltage provider configured to provide a second comparison current of a preset level; and a second comparison circuit configured to output the second detection signal by comparing the second detection current and the second comparison current, wherein the second buffer receives a second test signal of, in a voltage range between a high voltage higher than a medium voltage and a low voltage lower than the medium voltage, a second voltage range between the medium voltage and the low voltage, and includes an output circuit which outputs the second detection current corresponding to the second test signal.

8. The display driving circuit according to claim 7, wherein the second comparison circuit outputs the second detection signal by comparing a third copy current obtained by copying the second detection current and a fourth copy current obtained by copying the second comparison current.

9. A display driving circuit comprising:

a first detection line;

a second detection line;

a first switching circuit configured to connect the first detection line to one output lines among odd-numbered first output lines which are connected to odd-numbered first data lines of a display panel and even-numbered second output lines which are connected to even-numbered second data lines of the display panel;

a second switching circuit configured to connect the second detection line to the other output lines among the first output lines and the second output lines;

a first detection circuit including first and second transistors connected to a comparator, and configured to output a first detection current to the first detection line, wherein the first transistor provides a first copy current proportional to the first detection current to the comparator, and the second transistor provides a second copy current proportional to a first comparison current to the comparator, and the comparator outputs a first detection signal corresponding to a difference between the first detection current and the first comparison current by comparing the first detection current and the first comparison current; and a second detection circuit configured to output a second detection current to the second detection line, and output a second detection signal corresponding to a change in the second detection current, wherein the first switching state and the second switching state are alternately performed, in the first switching state, the first switching circuit simultaneously connects the first detection line to the first output lines and the second switching circuit simultaneously connects the second detection line to the second output lines, and in the second switching state, the first switching circuit simultaneously connects the first detection line to the second output lines and the second switching circuit simultaneously connects the second detection line to the first output lines.

10. The display driving circuit according to claim 9, wherein the first switching circuit and the second switching circuit alternately perform connections of a first switching state and a second switching state for a pair of a first output line and a second output line which are adjacent to each other, the connections of the first switching state and the second switching state are performed in a time division manner by the unit of a pair of adjacent output lines, in the first switching state, the first switching circuit connects the first detection line to the first output line and the second switching circuit connects the second detection line to the second output line, and in the second switching state, the first switching circuit connects the first detection line to the second output line and the second switching circuit connects the second detection line to the first output line.

11. The display driving circuit according to claim 9, wherein the first output lines and the second output lines are classified into a first group and a second group, a first switching state and a second switching state for the first group are alternately performed, and then, the first switching state and the second switching state for the second group are alternately performed, in the first switching state, the first switching circuit simultaneously connects the first detection line to the first output lines and the second switching circuit simultaneously connects the second detection line to the second output lines, and in the second switching state, the first switching circuit simultaneously connects the first detection line to the second output lines and the second switching circuit simultaneously connects the second detection line to the first output lines.

12. The display driving circuit according to claim 9, wherein the first output lines and the second output lines are classified into a first group and a second group, the first detection circuit and the second detection circuit are configured for each of the first group and the second group, a first switching state and a second switching state are alternately performed for each group, in the first switching state, the first switching circuit simultaneously connects the first detection line to the first output lines and the second switching circuit simultaneously connects the second detection line to the second output lines, and in the second switching state, the first switching circuit simultaneously connects the first detection line to the second output lines and the second switching circuit simultaneously connects the second detection line to the first output lines.

13. The display driving circuit according to claim 9, wherein the first output lines and the second output lines are classified into a first group and a second group, the first detection circuit and the second detection circuit are configured for each of the first group and the second group, in each group, the first switching circuit and the second switching circuit alternately perform connections of a first switching state and a second switching state for a pair of a first output line and a second output line which are adjacent to each other, in each group, the connections of the first switching state and the second switching state are performed in a time division manner by the unit of a pair of adjacent output lines, in the first switching state, the first switching circuit connects the first detection line to the first output lines and the second switching circuit connects the second detection line to the second output lines, and in the second switching state, the first switching circuit connects the first detection line to the second output lines and the second switching circuit connects the second detection line to the first output lines.

* * * * *